(12) United States Patent
Seo et al.

(10) Patent No.: US 10,158,237 B2
(45) Date of Patent: Dec. 18, 2018

(54) BATTERY PACK AND ELECTRIC BIKE INCLUDING THE SAME

(71) Applicant: SAMSUNG SDI CO., LTD., Yongin-si, Gyeonggi-do (KR)

(72) Inventors: Youngdong Seo, Yongin-si (KR); Seotaek Oh, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 212 days.

(21) Appl. No.: 15/194,606

(22) Filed: Jun. 28, 2016

(65) Prior Publication Data
US 2017/0005493 A1    Jan. 5, 2017

(30) Foreign Application Priority Data
Jul. 3, 2015  (KR) .................. 10-2015-0095358

(51) Int. Cl.
*H02J 7/00*  (2006.01)
*B60L 11/18*  (2006.01)

(52) U.S. Cl.
CPC ......... *H02J 7/0026* (2013.01); *B60L 11/1861* (2013.01); *B60L 11/1864* (2013.01); *Y02T 10/7055* (2013.01)

(58) Field of Classification Search
CPC ....................................... H02J 7/026
USPC ....................................... 320/109
See application file for complete search history.

(56) References Cited

U.S. PATENT DOCUMENTS

| 7,266,441 | B2 | 9/2007 | Shim | |
| 8,467,159 | B2 | 6/2013 | Jung et al. | |
| 9,496,543 | B2* | 11/2016 | Kwon | G01R 31/36 |
| 2011/0095623 | A1* | 4/2011 | Doh | B60L 3/0046 |
| | | | | 307/119 |
| 2014/0091618 | A1 | 4/2014 | Jeong | |

FOREIGN PATENT DOCUMENTS

| KR | 10-2007-0047516 A | 5/2007 |
| KR | 10-2010-0099526 A | 9/2010 |
| KR | 10-2013-0079793 A | 7/2013 |
| KR | 10-2014-0042597 A | 4/2014 |

* cited by examiner

*Primary Examiner* — Edward Tso
*Assistant Examiner* — Ahmed Omar
(74) *Attorney, Agent, or Firm* — Lee & Morse, P.C.

(57) ABSTRACT

A battery pack includes a battery, a battery management system (BMS), a charge switch, a discharge switch, and a tilt sensor. The BMS monitors voltage and current states of the battery and control charge and discharge operations of the battery. The charge and discharge switches operate based on control signals from the BMS. The BMS measures a variation in tilt angle of the battery pack or a load based on tilt information sensed by the tilt sensor, and turns off the discharge switch when the tilt angle variation is equal to or less than a first critical value for a preset time period. The load may be an electric vehicle or another type of load.

16 Claims, 3 Drawing Sheets

BATTERY PACK AND ELECTRIC BIKE INCLUDING THE SAME

CROSS-REFERENCE TO RELATED APPLICATION

Korean Patent Application No. 10-2015-0095358, filed on Jul. 3, 2015, in the Korean Intellectual Property Office, and entitled: "Battery Pack and Electric Bike Including the Same," is incorporated by reference herein in its entirety.

BACKGROUND

1. Field

One or more embodiments described herein relate to a battery pack and an electric bike including a battery pack.

2. Description of the Related Art

Rechargeable batteries are used in a variety of portable devices and may be combined to form a battery pack. One type of battery pack includes battery cells and a peripheral circuit. The peripheral circuit may be provided on a printed circuit board for controlling charge and discharge operations of the battery cells. When a load is connected to the terminals of the battery pack, power is supplied from the battery cells to the load through the external terminals of the battery pack.

In addition to portable devices, a battery pack may be used to power an electric bike. However, problems may arise. For example, discharge current from the battery pack may be supplied to the electric bike even when the electric bike is not in use.

SUMMARY

In accordance with one or more embodiments, a battery pack includes a battery including at least one battery cell; a battery management system (BMS) to monitor voltage and current states of the battery and to control charge and discharge operations of the battery; a charge switch and a discharge switch to operate according to control signals from the BMS; and a tilt sensor, wherein the BMS is to measure a variation in tilt angle of the battery pack or a load based on tilt information sensed by the tilt sensor, and is to turn off the discharge switch when the tilt angle variation is equal to or less than a first critical value for a preset time period.

The BMS may turn off the discharge switch when the tilt angle variation is equal to or less than the first critical value for the preset time period and discharge current of the battery is equal to or lower than a second critical value for the preset time period. The BMS may turn off the tilt sensor when the discharge current of the battery exceeds the second critical value, and the BMS may turn on the tilt sensor when the discharge current of the battery is equal to or lower than the second critical value.

The BMS may turn on the discharge switch when the tilt angle variation is greater than the first critical value after the discharge switch is turned off. The battery pack may include an impact sensor, and the BMS may turn off the discharge switch when impulse sensed by the impact sensor is greater than a predetermined critical value.

In accordance with one or more other embodiments, a battery pack a battery including at least one battery cell; a battery management system (BMS) to monitor voltage and current states of the battery and to control charge and discharge operations of the battery; a charge switch and a discharge switch to operate according to control signals from the BMS; and a tilt sensor, wherein: the BMS is to calculate an average of discharge current of the battery output during a first preset time period and is to set the average as a second critical value when a variation in tilt angle of the battery pack or a load measured by the tilt sensor is equal to or less than a first critical value for the first preset time period, and the BMS is to turn off the discharge switch when a tilt angle variation measured by the tilt sensor is equal to or less than the first critical value for a second preset time period and the discharge current of the battery is equal to or lower than the second critical value for the second preset time period. The BMS may turn off the tilt sensor when the discharge current of the battery is greater than the second critical value, and the BMS may turn on the tilt sensor when the discharge current of the battery is equal to or lower than the second critical value.

In accordance with one or more other embodiments, an electric vehicle includes a motor to operate using electrical energy; and a battery pack to supplying electrical energy to the motor, wherein the battery pack includes: a battery including at least one battery cell; a battery management system (BMS) to monitor voltage and current states of the battery and to control charge and discharge operations of the battery; a charge switch and a discharge switch to operate according to control signals from the BMS; and a tilt sensor, wherein the BMS is to measure a variation of tilt angle of the battery pack or a load based on tilt information sensed by the tilt sensor, and wherein the BMS is to turn off the discharge switch when the tilt angle variation is equal to or less than a first critical value for a preset time period.

The BMS may turn off the discharge switch when the tilt angle variation is equal to or less than the first critical value for the preset time period and when discharge current of the battery is equal to or lower than a second critical value for the preset time period. The BMS may turn on the discharge switch when the BMS detects a tilt angle variation greater than the first critical value after the discharge switch is turned off. The electric bike may include an impact sensor, and the BMS may turn off the discharge switch when impulse sensed by the impact sensor is greater than a second critical value.

The BMS may turn off the tilt sensor when the discharge current of the battery is greater than the second critical value, and the BMS may turn on the tilt sensor when the discharge current of the battery is equal to or lower than the second critical value. The load may be a motor.

In accordance with one or more other embodiments, an apparatus includes an interface; and logic to control a discharge operation of a battery when a variation in tilt angle of the battery or a load connected to the battery is equal to or less than a first critical value for a preset time period, the logic to generate at least one signal to be output through the interface to control the discharge operation, the at least one signal to control flow of current from the battery to the load. The at least one signal may turn off a discharge switch coupled to the battery.

After the discharge switch has been turned off, the logic may generate a signal to automatically turn on the discharge switch when the tilt angle variation is greater than the first critical value. The logic may turn off the discharge switch when discharge current of the battery is equal to or lower than a second critical value for the preset time period. The logic may generate a signal to turn off a tilt sensor when discharge current of the battery exceeds a second critical value, and generate a signal to turn on the tilt sensor when discharge current of the battery is equal to or lower than the second critical value. The logic may turn off the discharge operation when an impulse sensed by an impact sensor is greater than a predetermined critical value.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
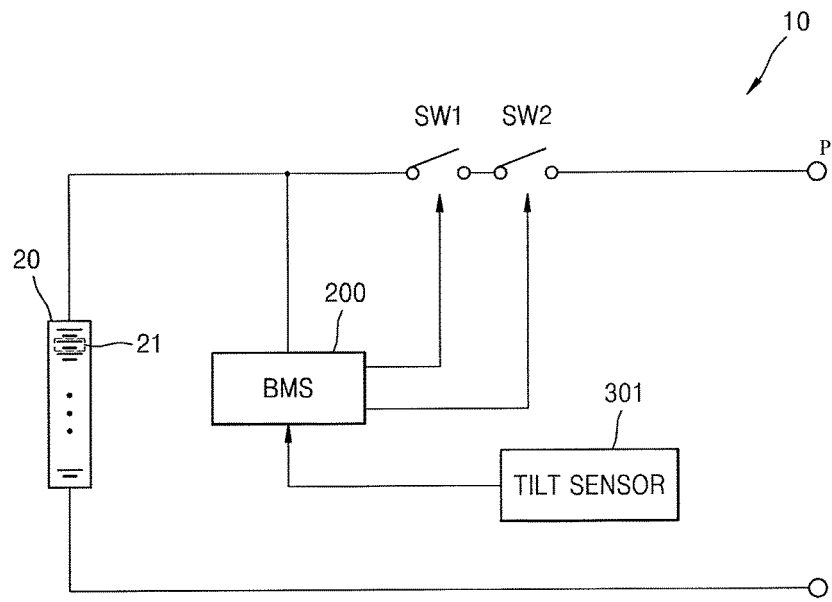
FIG. 1 illustrates an embodiment of a battery pack.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

FIG. 1 illustrates an embodiment of a battery pack 10 which includes a battery 20, a charge switch SW1, a discharge switch SW2, a battery management system (BMS) 200, and a tilt sensor 301. The battery 20 stores electricity and includes at least one battery cell 21. In one embodiment, the battery 20 may include a plurality of battery cells 21 connected in series, parallel, or series-parallel. The number of battery cells and their method of connection may be determined, for example, according to a required output voltage and/or a required electricity storage capacity.

The battery cells 21 may include rechargeable battery cells. For example, the battery cells 21 may include nickel-cadmium battery cells, lead battery cells, nickel metal hydride (NMH) battery cells, lithium-ion battery cells, lithium polymer battery cells, or a combination thereof.

The charge switch SW1 and the discharge switch SW2 are connected between the battery 20 and a terminal P of the battery pack 10 (for example, between a positive electrode of the battery 20 and a terminal P+ of the battery pack 10, or between a negative electrode of the battery 20 and a terminal P− of the battery pack 10). For example, the charge switch SW1 and the discharge switch SW2 may be arranged along a high-current path through which charge current or discharge current flows. The charge switch SW1 and the discharge switch SW2 may interrupt charge current and discharge current according to control signals.

The charge switch SW1 and the discharge switch SW2 may include transistors or relays. When the charge switch SW1 and the discharge switch SW2 are transistor switches, each of the charge switch SW1 and the discharge switch SW2 may include a parasitic diode. Discharge current of the battery 20 may flow in the forward direction of the parasitic diode of the charge switch SW1 (e.g., a direction from the positive electrode of the battery 20 to the terminal P+). Therefore, when the charge switch SW1 is turned off, only current flowing in a charge direction of the battery 20 (e.g., a direction from the terminal P+ to the positive electrode of the battery 20) is interrupted. Charge current for charging the battery 20 flows in the forward direction of the parasitic diode of the discharge switch SW2. Therefore, when the discharge switch SW2 is turned off, only current flowing in the discharge direction of the battery 20 is interrupted.

The tilt sensor 301 senses the tilt angle of the battery pack 10. In FIG. 1, the tilt sensor 301 is separate from the BMS 200. However, the tilt sensor 301 may be combined with the BMS 200 or may be at a location different from that in FIG. 1. The tilt angle of the battery pack 10 may be measured relative to the direction of gravity or may be measured relative to another direction or reference axis. In one embodiment, the battery pack 10 may include a gyro sensor to measure tilt angle and acceleration of the battery pack 10. The tilt sensor 301 may be a different type of sensor in another embodiment.

The BMS 200 controls charge current or discharge current of the battery pack 10. For example, the BMS 200 perform functions which include but are not limited to overcharge protection, overdischarge protection, overcurrent protection, overvoltage protection, overheat protection, or cell balancing. The BMS 200 may perform these protection functions based on one or more states (e.g., current, voltage, temperature, remaining electricity, lifespan, state of charge, etc.) of the battery 20. These one or more states may be determined, for example, based on signals from one or more sensors, e.g., temperature sensor, current sensor, voltage sensor, etc. The BMS 200 may control the charge current or discharge current of the battery pack 10, for example, by controlling the charge switch SW1 and the discharge switch SW2.

The BMS 200 receives tilt angle information from the tilt sensor 301 and calculates a tilt angle variation of the battery pack 10 based on the tilt angle information. The BMS 200 determines whether the calculated tilt angle variation is equal to or less than a first critical value for a preset time period Ts.

When the battery pack 10 is connected to a load (e.g., an electric bike) and the load is not in operation, discharge current of the battery pack 10 may be interrupted in order to increase the lifespan or efficiency of the battery pack 10. The load may be another type of device in a different embodiment, e.g., may not be an electric bike but an electronic device, another type of vehicle, etc.

The BMS 200 may analyze tilt angle information received from the tilt sensor 301 to determine whether the load, to which the battery pack 10 is connected, is in operation. When it is determined that the load is not in operation, the BMS 200 may interrupt discharge current of the battery pack 10. The first critical value is a reference value for determining whether the load is not in operation, e.g., whether the load is stationary when the load is an electric bike. The first critical value may be a preset value.

The time period Ts may be set to prevent the BMS 200 from performing a discharge current interrupting control operation too quickly or too often. For example, depending on the type of load, a decrease in the tilt angle variation of the battery pack 10 may occur for only a moment or a very short period of time. The time period Ts may be set so that the BMS 200 only performs a discharge current interrupting control operation when a decrease in the variation in tilt angle exists for the time period Ts.

For example, When the load is an electric bike or electric motorcycle, the tilt angle of the battery pack 10 may vary frequently. If the variation in tilt angle of the battery pack 10 is equal to or less than the first critical value, a determination may be made by the BMS 200 as to whether this state (e.g., reduced tilt angle variation) persists for a predetermined time period Ts. Under these conditions, the BMS 200 may turn off the discharge switch SW2 only when the tilt angle variation of the battery pack 10 is equal to or less than the first critical value for the time period Ts. In this manner, the BMS 200 may not frequently interrupt the discharge current.

As previously indicated, in one exemplary embodiment, the tilt sensor 301 senses the tilt angle of the battery pack 10. The BMS 200 calculates the tilt angle variation of the battery pack 10 based on information indicative of the tilt angle of the battery pack 10 output from the tilt sensor 301. When the tilt angle variation of the battery pack 10 is equal to or less than the first critical value for the time period Ts, the BMS 200 determines that the battery pack 10 is not in use or is otherwise stationary. When the battery pack 10 is connected to an external device under these conditions, discharge current may continuously flow because of standby power of the external device. Thus electricity may be unnecessarily consumed. The battery pack 10 may turn off the discharge switch SW2 to interrupt unnecessary discharge current of the battery pack 10 and to prepare for a possible short circuit in the external device.

In another embodiment, the tilt sensor 301 may be located on the load (e.g., the electric bike) and connected to the BMS 200.

When the tilt angle variation of the battery pack 10 becomes greater than the first critical value after the discharge switch SW2 is turned off, the BMS 200 may turn on the discharge switch SW2 to resume the discharge operation. Thus, in one embodiment, the tilt sensor 301 may continuously sense the tilt angle of the battery pack 10, even after the discharge switch SW2 is turned off, to interrupt the discharge current. The discharge operation of the battery pack 10 may therefore be resumed without having to perform any manual manipulation.

Figure 2:
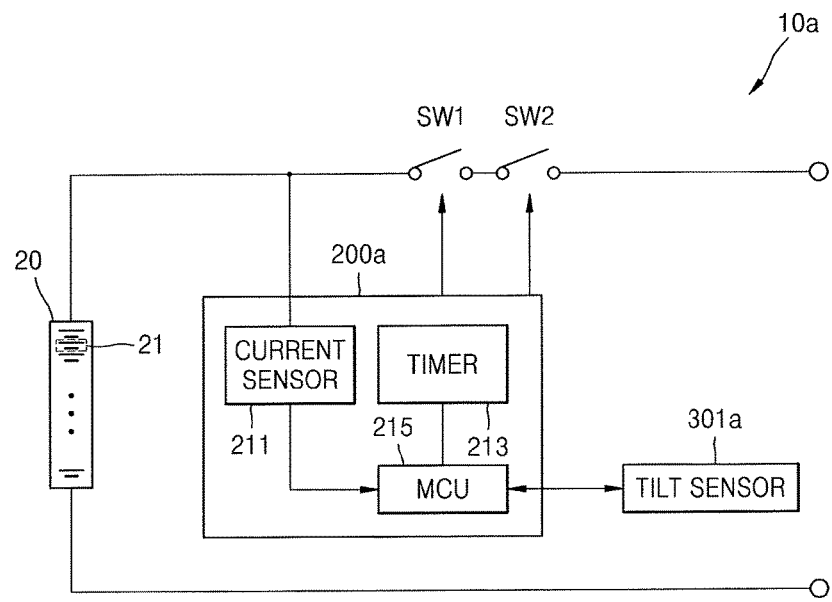
FIG. 2 illustrates another embodiment of a battery pack.

FIG. 2 illustrates another embodiment of a battery pack 10a which includes a battery 20, a charge switch SW1, a discharge switch SW2, a BMS 200a, and a tilt sensor 301a. The battery 20, the charge switch SW1, and the discharge switch SW2 may be the same as the battery 20, the charge switch SW1, and the discharge switch SW2 in FIG. 1.

The BMS 200a includes a current sensor 211 and a timer 213. The BMS 200a may transmit control signals to the tilt sensor 301a for stopping/resuming operation of the tilt sensor 301a. The tilt sensor 301a may be the same as the tilt sensor 301 in FIG. 1, except that operation of the tilt sensor 301a may be stopped or resumed according to control signals of the BMS 200a.

The current sensor 211 measures charge current flowing to the battery 20 and discharge current flowing out from the battery 20. In this embodiment, the current sensor 211 is in the BMS 200a. However, the current sensor 211 may be at another location outside of and connected to the BMS 200a in another embodiment.

The timer 213 may also be in the BMS 200a. The timer 213 counts time, for example, from the moment when the variation of a tilt angle sensed by the tilt sensor 301a becomes equal to or less than the first critical value described with reference to FIG. 1. The timer 213 may generate a signal to inform an MCU 215 of whether the counted time exceeds the time period Ts.

The MCU 215 may be a micro-controller or another type of control or processing device. The MCU 215 may be in the BMS 200a or at another location outside the BMS 200a. The MCU 215 analyzes and calculates information transmitted to the BMS 200a. According to results of the calculation, the MCU 215 controls the charge switch SW1 and the discharge switch SW2, for example, to prevent overcharge and overdischarge of battery cells 21 of the battery 20 and the occurrence of an overcurrent condition in the battery cells 21. For example, the MCU 215 compares the voltage of the battery cells 21 with a set voltage level and outputs a control signal according to results of the comparison. The control signal may be used to turn on or off the charge switch SW1 and the discharge switch SW2, to thereby prevent overcharge and overdischarge of the battery cells 21 and the occurrence of an overcurrent condition in the battery cells 21.

In addition, the MCU 215 may receive a signal including information indicative of the tilt angle of the battery pack 10a from the tilt sensor 301a and may calculate a tilt angle variation of the battery pack 10a. Then, the MCU 215 may determine whether the tilt angle variation exceeds the first critical value during the time period Ts and control the discharge switch SW2 according to results of the determination.

In addition, the MCU 215 may compare a current value from the current sensor 211 with a second critical value. In a non-limiting example, the current value from the current sensor 211 may correspond to a discharge current value of the battery 20 and the second critical value may be a discharge current value corresponding to when the battery pack 10a is connected to a load that is not in operation, e.g., when the electric bike is stationary. That is, the second critical value may correspond to a current value when the load, to which the battery pack 10a is connected, is not in operation. In one embodiment, the second critical value may correspond to a standby current value of the load. (When the load is described as an electric bike or vehicle, the load may actually be understood to correspond to a motor of the electric bike or vehicle).

In an exemplary embodiment, the BMS 200a compares a current value measured using the current sensor 211 with the second critical value to determine whether the current value is equal to or lower than the second critical value. When the tilt angle variation of the battery 20 is equal to or less than the first critical value for the time period Ts and the current value measured using the current sensor 211 is equal to or lower than the second critical value for the time period Ts, the BMS 200a determines that the battery pack 10a does not need to output discharge current and turns off the discharge switch SW2.

In another exemplary embodiment, since the discharge current of the battery pack 10a may vary frequently, the BMS 200a may check whether an average of discharge current output from the battery pack 10a over a predetermined time period is equal to or lower than the second critical value. For example, if the tilt angle variation of the battery 20 is equal to or less than the first critical value for the time period Ts, the BMS 200a compares the second critical value with the average of discharge current measured using the current sensor 211 during the time period Ts. If the average of the discharge current is equal to or lower than the second critical value, the BMS 200a turns off the discharge switch SW2.

In another exemplary embodiment, if the discharge current of the battery pack 10a is equal to or lower than the first critical value, the BMS 200a may operate the tilt sensor 301a. If the discharge current of the battery pack 10a is greater than the second critical value, the BMS 200a may not operate the tilt sensor 301a. For example, when the battery pack 10a is connected to a load (e.g., electric bike), if it is unnecessary to determine whether the load is stationary and not in use, the BMS 200a may turn the tilt sensor 301a off to minimize the power consumption of the tilt sensor 301a. That is, if the discharge current of the battery pack 10a is equal to or lower than the second critical value, the BMS 200a to check whether the load is not in use and stay in a stationary state. Thus, the BMS 200a may operate the tilt sensor 301a to measure the tilt angle of the load.

In another exemplary embodiment, if the discharge current of the battery pack 10a is equal to or lower than the second critical value for the time period Ts, the BMS 200a may operate the tilt sensor 301a. If the discharge current of the battery pack 10a is not equal to or lower than the second critical value for the time period Ts, the BMS 200a may not operate the tilt sensor 301a. The reason for this is that, for example, when the battery pack 10a is connected to a load such as an electric bike, even though the load operates, the discharge current of the battery pack 10a may be temporarily equal to or lower than the second critical value.

In another exemplary embodiment, the BMS 200a may vary the second critical value with time. For example, when the battery pack 10a is connected to a load such as an electric bike, a component requiring electricity may be additionally attached to the load. In this case, even though the load is not in use, the discharge current of the battery pack 10a may be increased to a value greater than the second critical value because of the additional component. Therefore, in this case, the second critical value may be varied or updated according to the increased discharge current of the battery pack 10a.

To this end, if the tilt angle variation measured by the tilt sensor 301a is equal to or less than the first critical value for a preset first time period T1, the BMS 200a may determine that the load has stayed stationary and may change the second critical value to a value corresponding to the average of discharge current of the battery 20, increased during the first time period T1.

If the tilt angle variation of the battery pack 10a measured by the tilt sensor 301a is equal to or less than the first critical value for a preset second time period T2, and the discharge current of the battery pack 10a is equal to or lower than the changed second critical value for the second time period T2, the BMS 200a may turn off the discharge switch SW2. The first time period T1 and the second time period T2 may therefore correspond to sequential operations and may be different values in another embodiment. In one embodiment, each of the first time period T1 and the second time period T2 may correspond to the time period Ts.

Figure 3:
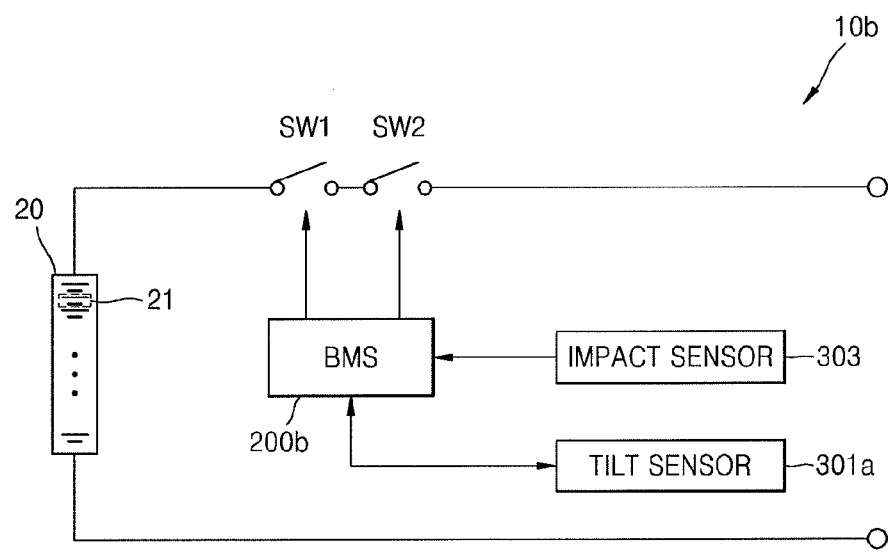
FIG. 3 illustrates another embodiment of a battery pack.

FIG. 3 illustrates another embodiment of a battery pack 10b which includes a battery 20, a charge switch SW1, a discharge switch SW2, a BMS 200b, a tilt sensor 301a, and an impact sensor 303. The battery 20, the charge switch SW1, the discharge switch SW2, and the tilt sensor 301a may correspond to the battery 20, the charge switch SW1, the discharge switch SW2, and the tilt sensor 301a in FIG. 2.

The impact sensor 303 measures impulse applied to the battery pack 10b and transmits information indicative of the measured impulse to the BMS 200b. The impact sensor 303 is shown to be separate from the BMS 200b, but may be in BMS 200b in another embodiment.

The BMS 200b determines whether the impulse measured using the impact sensor 303 is greater than a third critical value. For example, when the battery pack 10b is connected to a load such as an electric bike, if the discharge current of the battery pack 10b is continuously maintained at a certain level after a certain degree of impulse is applied to the battery pack 10b, the user of the load may be in danger or the battery pack 10b may be damaged. In this case, the discharge current of the battery pack 10b may be interrupted. The degree of impulse that may endanger a user or damage the battery pack 10b may be preset, for example, as the third critical value.

The BMS 200b may determine whether the impulse measured using the impact sensor 303 is greater than the third critical value. If the impulse measured by the impact sensor 303 is greater than the third critical value, the BMS 200b may turn off the discharge switch SW2 to protect the battery pack 10b or the user of the load. In this manner, the stability and reliability of the battery pack 10b may be improved.

Figure 4:
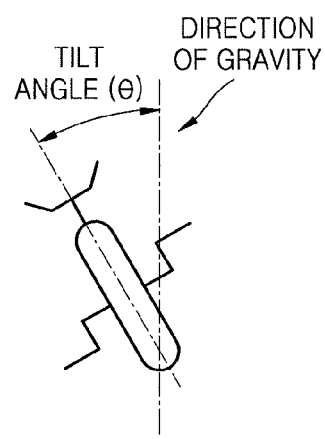
FIG. 4 illustrates an example of measuring a tilt angle.

FIG. 4 illustrates an example of a tilted state of the load when the load is n electric bike. Referring to FIG. 4, the tilt angle of the electric bike (e.g., reference numeral 31 in FIG. 5) may be defined relative to the direction of gravity. The tilt angle may be determined relative to a different direction or axis in another embodiment. As shown in FIG. 4, the electric bike is oriented at a tilt angle θ relative to the direction of gravity.

Figure 5:
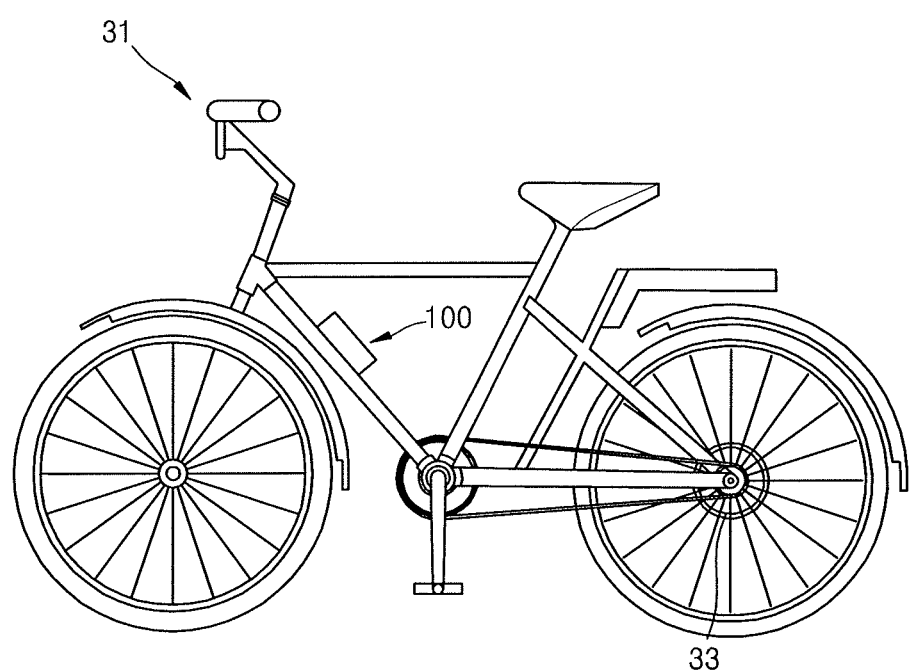
FIG. 5 illustrates an embodiment of an electric bike including a battery pack.

FIG. 5 illustrates an embodiment of an electric bike 31 including a battery pack 100 according to any of the aforementioned embodiments. Referring to FIG. 5, the electric bike 31 includes a motor 33 and the battery pack 100. The battery pack 100 may be one of the battery packs 10, 10a, and 10b described with reference to FIGS. 1 to 3. For example, the battery pack 100 may include a battery, a BMS, a charge switch, a discharge switch, a tilt sensor, and an impact sensor as previously described.

Wheels of the electric bike 31 are driven by the motor 33, which converts electrical energy to kinetic energy. When a rider pedals the bike, power is transmitted to one or more wheels of the bike through a chain. The power may be transmitted by the motor 33 or a combination of the motor and mechanical force exerted by the user.

The battery pack 100 supplies electric energy to the motor 33 or other devices attached to the electric bike 31. The battery pack 100 may be attached to a frame of the electric bike 31 as shown in FIG. 5, or may be disposed in the frame of the electric bike 31. The battery pack 100 may be at a different position in another embodiment.

The motor 33 is electrically connected to the battery pack 100 to receive electric energy from the battery pack 100. For example, as shown in FIG. 5, the motor 33 may be at a center position of a rear wheel of the electric bike 31. The motor 33 may be at a different position in another embodiment. The motor 33 converts electrical energy from the battery pack 100 to kinetic energy.

In an exemplary embodiment, the tilt sensor senses the tilt angle of the electric bike 31. When the variation of the tilt angle of the electric bike 31 is equal to or less than a first critical value for a preset time period Ts, it is determined that the electric bike 31 is not in use. Thus, discharge current of the battery pack 100 is interrupted. The time period Ts and the first critical value may be the same as those described with reference to any of the aforementioned embodiments.

A second critical value may be set to a value corresponding to a current value when a load, to which the battery pack 100 is connected, is not in operation. For example, the second critical value may correspond to a standby current value of the electric bike 31. In one embodiment, the second critical value may be set to be a discharge current value of the battery pack 100 when the electric bike 31 is not in use.

The second critical value may be a different value in another embodiment. For example, the second critical value may correspond to a discharge current value of the battery pack 100 which may be used as a basis for predicting that the electric bike 31 is not, or will not be, in use and stationary.

In another exemplary embodiment, when the tilt angle variation of the electric bike 31 is equal to or less than the first critical value for the time period Ts, and the discharge current of the battery pack 100 is equal to or lower than the second critical value for the time period, the BMS may determine that the electric bike 31 is not in use and stationary and may interrupt discharge current output from the battery pack 100 to the electric bike 31.

In another exemplary embodiment, after the discharge current of the battery pack 100 is interrupted because the electric bike 31 is not in use, when the tilt angle variation of the electric bike 31 exceeds the first critical value, the battery pack 100 is electrically reconnected to the electric bike 31. To this end, the tilt sensor measures the tilt angle of the electric bike 31 even after the discharge current of the battery pack 100 is interrupted.

When the tilt angle variation of the electric bike 31 exceeds the first critical value, the battery pack 100 outputs discharge current again. In this case, a rider does not need to manipulate the electric bike 31 or the battery pack 100 to resume a discharge operation of the battery pack 100. Therefore, the rider may conveniently use the electric bike 31, and the electric bike 31 may quickly return to normal operation.

In another exemplary embodiment, BMS, MCU, or another circuit may change or update the second critical value. For example, the battery pack 100 may supply electricity to electric components of the electric bike 31 as well as to the motor 33. As the number of components attached the electric bike 31 increases, the discharge current of the battery pack 100 may increase, even when the electric bike 31 is not used for riding. In this case, the discharge current of the battery pack 100 which corresponds to a stationary state may exceed the second critical value. Therefore, the second critical value may be varied in the manner described with reference to any of the aforementioned embodiments.

In another exemplary embodiment, the electric bike 31 may include an impact sensor such as the impact sensor 303 described with reference to FIG. 3. If impulse measured with the impact sensor is greater than the third critical value explained with reference to FIG. 3, power to the electric bike 31 may be interrupted. For example, if the electric bike 31 falls because of an impact, power transmission from the battery pack 100 to the electric bike 31 may be interrupted to protect a rider and the battery pack 100. In this manner, the stability and reliability of the battery pack 100 may be improved.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The BMS and/or MCU may be implemented in logic which, for example, may include hardware, software, or both. When implemented at least partially in hardware, the BMU and/or MCU may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the BMS and/or MCU may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments described herein.

In accordance with another embodiment, an apparatus includes an interface and logic to control a discharge operation of a battery when a variation in tilt angle of the battery or a load connected to the battery is equal to or less than a first critical value for a preset time period. The logic generates at least one signal that is output through the interface to control the discharge operation. The at least one signal controls flow of current from the battery to the load. The at least one signal turns off a discharge switch coupled to the battery.

After the discharge switch has been turned off, the logic may generate a signal to automatically turn on the discharge switch when the tilt angle variation is greater than the first critical value. The logic may turn off the discharge switch when discharge current of the battery is equal to or lower than a second critical value for the preset time period. The logic may generate a signal to turn off a tilt sensor when discharge current of the battery exceeds a second critical value, and may generate a signal to turn on the tilt sensor when discharge current of the battery is equal to or lower than the second critical value. The logic may turn off the discharge operation when an impulse sensed by an impact sensor is greater than a predetermined critical value.

The logic may be the BMS or MCU of any of the aforementioned embodiments. The interface may take various forms. For example, when the logic is embodied within an integrated circuit chip, the interface may be one or more output terminals, leads, wires, ports, signal lines, or other type of interface without or coupled to the chip.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A battery pack, comprising:
a battery including at least one battery cell;
a battery management system (BMS) to monitor voltage and current states of the battery and to control charge and discharge operations of the battery;
a charge switch and a discharge switch to operate according to control signals from the BMS; and
a tilt sensor, wherein the BMS is to measure a variation in tilt angle of the battery pack or a load based on tilt information sensed by the tilt sensor, and is to turn off the discharge switch when the tilt angle variation is equal to or less than a first critical value for a preset time period, and
wherein the BMS is to turn off the discharge switch when the tilt angle variation is equal to or less than the first critical value for the preset time period and discharge current of the battery is equal to or lower than a second critical value for the preset time period.

2. The battery pack as claimed in claim 1, wherein:
the BMS is to turn off the tilt sensor when the discharge current of the battery exceeds the second critical value, and
the BMS is to turn on the tilt sensor when the discharge current of the battery is equal to or lower than the second critical value.

3. The battery pack as claimed in claim 1, wherein the BMS is to turn on the discharge switch when the tilt angle variation is greater than the first critical value after the discharge switch is turned off.

4. The battery pack as claimed in claim 1, further comprising:
an impact sensor,
wherein the BMS is to turn off the discharge switch when an impulse sensed by the impact sensor is greater than a predetermined critical value.

5. A battery pack, comprising:
a battery including at least one battery cell;
a battery management system (BMS) to monitor voltage and current states of the battery and to control charge and discharge operations of the battery;
a charge switch and a discharge switch to operate according to control signals from the BMS; and
a tilt sensor, wherein:
the BMS is to calculate an average of discharge current of the battery output during a first preset time period and is to set the average as a second critical value when a variation in tilt angle of the battery pack or a load measured by the tilt sensor is equal to or less than a first critical value for the first preset time period, and
the BMS is to turn off the discharge switch when a tilt angle variation measured by the tilt sensor is equal to or less than the first critical value for a second preset time period and the discharge current of the battery is equal to or lower than the second critical value for the second preset time period.

6. The battery pack as claimed in claim 5, wherein:
the BMS is to turn off the tilt sensor when the discharge current of the battery is greater than the second critical value, and
the BMS is to turn on the tilt sensor when the discharge current of the battery is equal to or lower than the second critical value.

7. An electric vehicle, comprising:
a motor to operate using electrical energy; and
a battery pack to supplying electrical energy to the motor, wherein the battery pack includes:
a battery including at least one battery cell;
a battery management system (BMS) to monitor voltage and current states of the battery and to control charge and discharge operations of the battery;
a charge switch and a discharge switch to operate according to control signals from the BMS; and
a tilt sensor, wherein the BMS is to measure a variation of tilt angle of the battery pack or a load based on tilt information sensed by the tilt sensor, and wherein the BMS is to turn off the discharge switch when the tilt angle variation is equal to or less than a first critical value for a preset time period, and
wherein the BMS is to turn off the discharge switch when the tilt angle variation is equal to or less than the first critical value for the preset time period and when discharge current of the battery is equal to or lower than a second critical value for the preset time period.

8. The electric vehicle as claimed in claim 7, wherein the BMS is to turn on the discharge switch when the BMS detects a tilt angle variation greater than the first critical value after the discharge switch is turned off.

9. The electric vehicle as claimed in claim 7, further comprising:
an impact sensor,
wherein the BMS is to turn off the discharge switch when an impulse sensed by the impact sensor is greater than a second critical value.

10. The electric vehicle as claimed in claim 7, wherein:
the BMS is to turn off the tilt sensor when the discharge current of the battery is greater than the second critical value, and
the BMS is to turn on the tilt sensor when the discharge current of the battery is equal to or lower than the second critical value.

11. The electric vehicle as claimed in claim 7, wherein the load is a motor.

12. An apparatus, comprising:
an interface; and
logic to control a discharge operation of a battery when a variation in tilt angle of the battery or a load connected to the battery is equal to or less than a first critical value for a preset time period, the logic to generate at least one signal to be output through the interface to control the discharge operation, the at least one signal to control flow of current from the battery to the load, wherein the logic is to:

generate a signal to turn off a tilt sensor when discharge current of the battery exceeds a second critical value, and generate a signal to turn on the tilt sensor when discharge current of the battery is equal to or lower than the second critical value.

13. The apparatus as claimed in claim 12, wherein the at least one signal is to turn off a discharge switch coupled to the battery.

14. The apparatus as claimed in claim 13, wherein, after the discharge switch has been turned off, the logic is to generate a signal to automatically turn on the discharge switch when the tilt angle variation is greater than the first critical value.

15. The apparatus as claimed in claim 12, wherein the logic is to turn off a discharge switch coupled to the battery when discharge current of the battery is equal to or lower than a second critical value for the preset time period.

16. The apparatus as claimed in claim 12, wherein the logic is to turn off the discharge operation when an impulse sensed by an impact sensor is greater than a predetermined critical value.

* * * * *